July 24, 1923.
G. G. F. BOSWELL
1,462,737
COMBINED SHOCK ABSORBER AND REBOUND CHECK FOR MOTOR PROPELLED VEHICLES
Filed Aug. 11, 1921    2 Sheets-Sheet 1
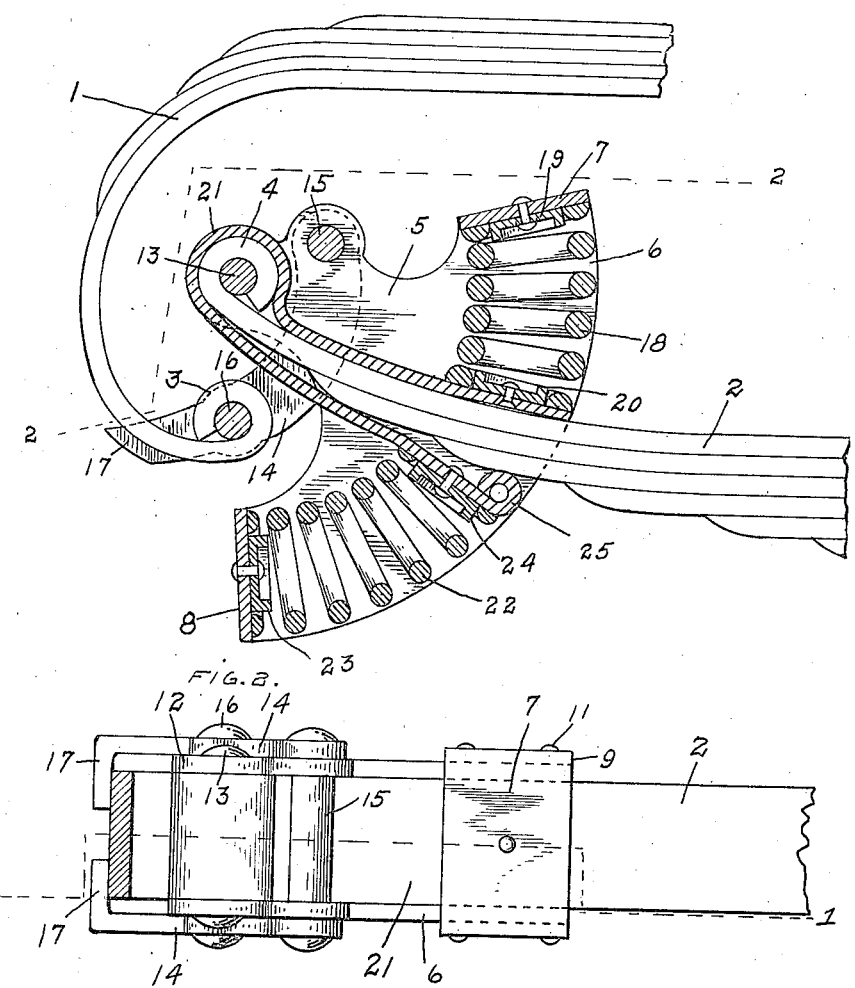
INVENTOR.
GEORGE G. F. BOSWELL
BY
ATTORNEY.

July 24, 1923.

G. G. F. BOSWELL 1,462,737

COMBINED SHOCK ABSORBER AND REBOUND CHECK FOR MOTOR PROPELLED VEHICLES

Filed Aug. 11, 1921

INVENTOR.
GEORGE G.F. BOSWELL.

BY

ATTORNEY.

Patented July 24, 1923.

1,462,737

UNITED STATES PATENT OFFICE.

GEORGE G. F. BOSWELL, OF INDIANAPOLIS, INDIANA.

COMBINED SHOCK ABSORBER AND REBOUND CHECK FOR MOTOR-PROPELLED VEHICLES.

Application filed August 11, 1921. Serial No. 491,501.

*To all whom it may concern:*

Be it known that I, GEORGE G. F. BOSWELL, a citizen of the United States, residing at Indianapolis, in the county of Marion and State of Indiana, have invented certain new and useful Improvements in Combined Shock Absorbers and Rebound Checks for Motor-Propelled Vehicles, of which the following is a specification.

This invention relates to a combined shock absorber and rebound check for motor propelled vehicles, and is designed primarily for use in connection with vehicles having a full or partial elliptical spring, and the prime feature of the invention is the provision of one or more springs positioned on opposite faces of parts of the body springs of the vehicle, certain of which assimilate shock when directed against parts of the vehicle, and the other to prevent or assimilate any undue rebound of the body portion of the vehicle.

A further feature of the invention is in so constructing the device that it may be substituted for the usual form of shackle, commonly employed for connecting the ends of the springs, or the springs and frame of the vehicle together, and without changing any of the parts of the springs or frame of the vehicle.

A further feature of the invention is the provision of a base or anchoring clip, so constructed that when attached to the spring of the vehicle the strain on the spring incident to a rebound action will be directed against a number of the leaves of the spring simultaneously, and A further feature of the invention is in so constructing the device that it may be very quickly and easily applied to use.

Other objects and advantages will be hereinafter more fully set forth and pointed out in the accompanying specification.

In the accompanying drawings which are made a part of this application,

Figure 1 is a sectional view of the combined shock absorber and rebound check as seen on line 1—1, Figure 2, showing the parts of the body spring of the vehicle in full lines, Figure 2 is a horizontal sectional view as seen on line 2—2 Figure 1.

Figure 3:
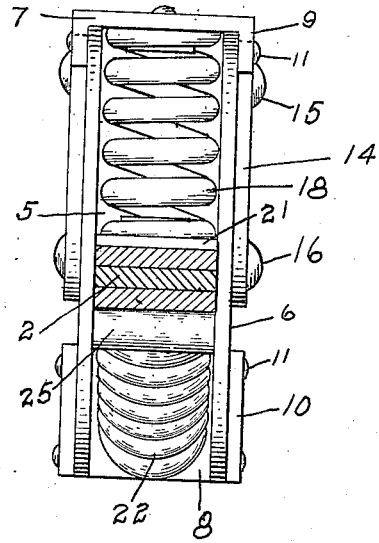
Figure 3 is a front elevation of the combined shock absorber and rebound check showing the body spring cooperating therewith in section.

Referring to the drawings in which similar reference numerals designate corresponding parts throughout the several views, 1 and 2 indicate the upper and lower sections respectively of the rear body spring of the vehicle, which may be of the usual or any preferred construction, in this instance having one leaf of the upper spring curved downwardly, and provided at its lower end with an eye 3, which normally rests in a plane vertically below an eye 4, at the end of the lower section 2, the section 1 being attached to the body frame of the vehicle while the section 2 is attached to the running gears of the vehicle.

Ordinarily the eyes 3 and 4 are connected by any suitable form of shackle which is pivotal but not yieldable, and as a substitute therefor a frame member or housing 5, is provided formed of segmental sections or plates 6, which pass on opposite sides of the lower section 2 of the spring and are connected together by cross straps 7 and 8, the ends of the straps having depending flanges 9 and 10 respectively, which fit over the side faces of the segmental sections 6 and are attached thereto in any suitable manner as by means of rivets 11. If preferred, however, the straps 7 and 8 may be formed integral with the side sections 6.

The sections 6 of the housing 5 terminate in extensions 12, by means of which the housing is pivotally connected with the lower section 2 of the body spring, a bolt or pin 13 being extended through the eye 4 and through the ends of the extensions 12. The upper section 1 of the body spring is connected with the housing 5 by means of shackle plates 14, which are preferably curved, and have their upper ends pivoted to the segmental sections 6, and at a point adjacent to the upper edge of said sections, and lateral of the pivotal connection between the extensions 12 and the eye 4, a bolt or pin 15 being extended transversely through the upper ends of the shackle plates and the interposed portions of the segmental sections 6. The upper section 1 of the body spring is pivotally connected between the lower ends of the shackle plates 14, which curve downwardly and outwardly so as to normally dispose the eye 3 in vertical alignment below the eye 4, a bolt or pin 16 being extended through the shackle plates and through the eye 3.

By curving the shackle plates in the manner shown, and placing the pivotal connection between the shackle plates and the segmental sections 6, laterally of the pivotal connection between the segmental sections and the eye 4, any movement of the upper section 1 of the body spring will cause the housing 5 to pivot on the bolt 13, and impart a vertical swinging movement to the end of the housing having the straps 7 and 8 connected therewith.

In order to regulate the action of the upper spring section 1 with respect to the housing 5, each shackle plate 14 is provided with an angular extension 17, which extensions project towards each other and overlap the outer face of the spring member 1, so that on the upward movement of the spring member 1 the extensions 17 will strike the outward face of the spring 1 and prevent further pivotal action of the shackle plates 14, and holding the shackle plates rigid and causing them to direct an upward thrust on the housing 5, but when the spring section 1 is moving in the opposite direction or outward, the shackle plates 14 will have more or less free swinging movement.

In order to assimilate any undue shock directed against the parts of the vehicle, as by the wheels of the vehicle striking an obstruction in the roadway, a shock-absorbing spring 18 is introduced between the upper face of the lower spring section 2 and the strap 7 at the upper end of the housing 5, the tension of the shock-absorbing spring being such that any undue jar will be taken up by the shock-absorbing spring and practically eliminated before it is imparted to the body portion of the vehicle. In this instance the shock-absorbing spring is shown as in cylindrical formation, although it will be understood that it may be made in various shapes, and in order to hold the shock-absorbing spring in position within the housing 5, a keeper 19 is attached to the under face of the strap 7 and a similar keeper 20 is connected with a clip 21. These keepers may be formed integral with the parts to which they are attached or formed separate and then attached to the parts in any suitable manner.

In order to check and practically eliminate any undue rebound of the body of the vehicle, or the parts to which the upper spring section 1 is attached, a coil spring 22 is placed on the opposite side or face of the lower spring section 2 from that occupied by the shock-absorbing spring 18, one end of the latter spring abutting against the other end of the clip 21, and its opposite end against the strap 8, keepers 23 and 24 being provided for holding the spring 22 in place, which keepers are similar to the keepers 19 and 20, and are connected with their respective parts in the same manner.

By placing the shock-absorbing spring 18 in axial alignment with the rebound spring 22, and on opposite sides of the body spring, that is, one above and one below the body spring, any action of either section of the body spring will first be directed against either the shock-absorbing spring or rebound spring; consequently any undue shock or movement of parts of the vehicle will be practically taken up and eliminated by these springs, thereby reducing to a minimum any shocks which would otherwise be imparted to the body of the vehicle.

In the usual manner of connecting the upper and lower sections of the body spring together, any rebound of the body of the vehicle is directed solely against the upper leaf of the lower section of the body spring, and frequently results in breakage of the spring. To overcome this objectionable feature and cause the rebound to be directed against a number of the leaves forming the lower section of the body spring, the clip 21 is composed of paralleling sections, integral at one end, and so shaped that one arm of the clip will lie upon the upper face of the section 2 of the body spring, and the other arm will pass below the lower section 2 and rest against the ends of the leaves forming the lower section 2, over which it passes, the integral end of the clip being formed into a loop which fits around the eye 4. In order to eliminate undue curvature axially of the rebound spring 22, that portion of the clip 21 engaged by the end of the rebound spring is extended at an angle to the general trend of the clip, and away from the under face of the lower section 2 of the body spring, thereby disposing the bent out section of the clip in more or less alignment with the inner face of the strap 8; consequently the compression of the spring 22 will be substantially uniform, or to such an extent that the spring will not buckle and disengage from the keepers 23 and 24. Any suitable means may be provided for causing the bent out portion of the clip 21 to engage with one of the leaves of the lower member 2, but in the present instance, the end of the clip engaged by the rebound spring 22 is rolled so as to form a bead 25, which presses against one leaf of the spring section 2.

The shock absorbing spring and the rebound spring are of a diameter substantially equal to the width of the body spring, and by positioning these springs one above and one below the body spring, and enclosing them in the housing as shown, any unsightly appearance is obviated, and the action of the sections of the body spring is identical with the action when shackled together in the usual manner.

Figure 4:
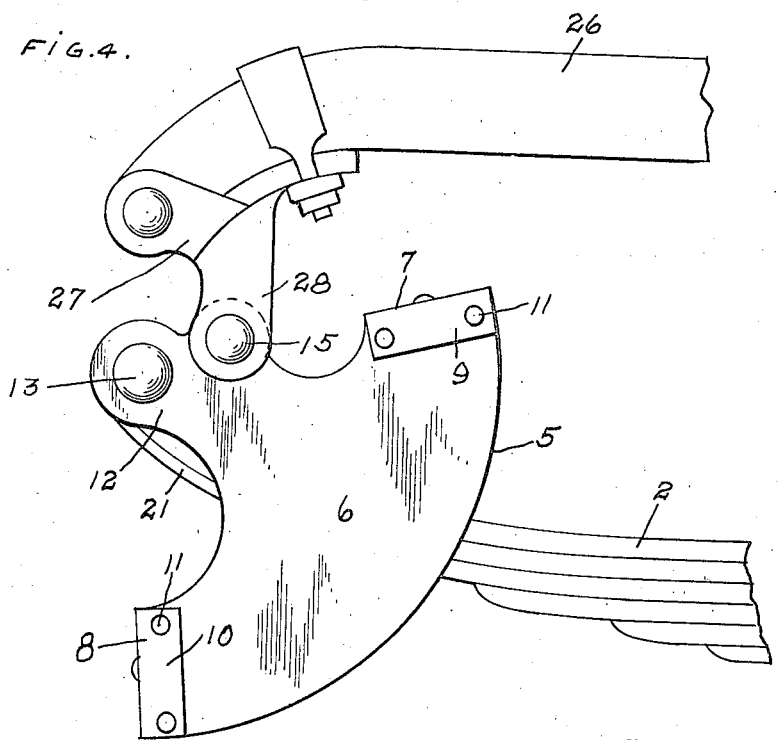
Figure 4 is a side elevation of a slightly modified form of structure.

In Figure 4 of the drawings the combined shock absorber and rebound check is shown as applied to use where the end of the body spring is connected direct to the frame of the vehicle, and in this instance the shackle plates 14 are dispensed with and the end of the frame 26 of the vehicle connected with the housing 5, by securing a shackle 27 to the frame 26, said shackle having depending ears 28 for engagement with bolt 15. With this form of device the thrust directed by the frame 26 will cause the shock absorber and rebound check to operate in a manner identical with the operation of the other form of device.

In installing the shock absorber the clip 21 is first introduced over the end of the section 2 of the body spring, which is accomplished by moving the clip edgewise, the arms of the clip moving over opposite faces of the section 2 of the body spring. The housing 5 is then inserted over the end of the section 2, said end passing between the side sections 6 and the straps 7 and 8, the housing being moved onto the section 2 until the extensions 12 are in position to receive the bolt 13. The bolt 13 is then introduced through the extensions 12 and the interposed eye 4, after which the free end of the housing is swung upwardly, and the ends of the shock absorbing spring 18 engaged with the keepers 19 and 20. Downward pressure is then directed against the housing 5, until the shock-absorbing spring 18 is sufficiently compressed to permit the rebound spring to enter between the lower arm of the clip 21 and the plate 8, the ends of the spring 22 being engaged with the keepers 23 and 24. After the spring 22 is properly seated the pressure on the housing is released, when the two springs will assume their normal positions. The shackle plates 14 are then connected to the housing 5 and eye 3 on the upper spring section respectively, by the bolts 15 and 16, and when so connected the parts are in operative position.

Having thus fully described my said invention, what I claim as new and desire to secure by Letters Patent, is:

1. In a combined shock absorber and rebound check for vehicles the combination with a body spring and means for pivotally suspending the body of the vehicle from said body spring, of yielding means on opposite faces of the body spring for absorbing shock and rebound and a clip slidable over the end of said body spring forming an anchor for said yielding means.

2. In a combined shock absorber and rebound check for vehicles the combination with a stationary body spring, of means for pivotally and yieldingly connecting the body of the vehicle to the outer end of said spring, a shock absorbing spring resting upon said body spring, and a rebound spring positioned below said body spring and in axial alignment with the shock absorber spring the axes of said springs being in radial alignment with the pivot end of said body spring.

3. In a combined shock absorber and rebound check for vehicles the combination with the upper and lower sections of a body spring, of means for pivotally and yieldingly connecting the upper section of the body spring with the lower section thereof, means on said pivot forming member for engagement with the upper spring section for forming a rigid connection between said parts incident to certain movements of said springs, a shock absorbing spring above said lower section of the body spring, and a rebound spring positioned below the lower section of the body spring and in axial alignment with the shock absorber spring, said shock absorber spring and rebound spring being actuated by the pivotal means between the body spring sections.

4. In a combined shock absorber and rebound check for vehicles, a lower body spring section, a shock absorber spring positioned above said body spring, a rebound spring positioned below the body spring, a clip fitting over the end of the lower body spring and receiving the inner ends of said shock absorbing and rebound springs, means pivoted to the end of the body spring for actuating the shock absorbing and rebound springs, and means for pivotally connecting the body of the vehicle to the actuating means for the shock absorbing and rebound springs.

5. In a combined shock absorber and rebound check for vehicles the combination with a body spring, of a housing pivotally connected to said body spring and having parts passing above and below the body spring, a clip fitting over the end of the body spring, a shock absorber spring interposed between the parts of the housing passing above said body spring and one arm of said clip, a rebound spring positioned between parts of the housing passing below the body spring and the opposite arm of said clip, and means for pivotally connecting the housing with parts of the body of the vehicle whereby any movement of the parts of the vehicle incident to shock or rebound will be directed against said shock absorbing spring or rebound spring.

6. In a combined shock absorber and rebound check for vehicles the combination with a body spring of the vehicle, of a housing comprising side members overlapping the edges of said body spring, connecting members for the side members, one passing above and the other below the body spring, means for pivotally connecting the housing to the end of the body spring, a shock absorber spring interposed between the upper face of the body spring and the connecting member passing above the body spring, a rebound spring positioned between the lower face of the body spring and the connecting member passing below the body spring, and means for pivotally connecting parts of the vehicle to said housing.

7. In a combined shock absorber and rebound check for vehicles the combination with a body spring for the vehicle formed of a plurality of leaves, of a rebound spring positioned below the body spring, means for compressing said rebound spring, and means for simultaneously directing the pressure of the rebound spring against a plurality of the leaves forming the body spring.

8. In a combined shock absorber and rebound check for vehicles the combination with a body spring comprising an upper and a lower section, of a housing, means for pivotally connecting the housing to said lower spring section, shackle plates for pivotally connecting the upper section of the body spring with said housing, and means for rendering said shackle plates rigid with said upper section incident to an upward movement or rebound of said upper spring section.

9. In a combined shock absorber and rebound check for vehicles the combination with a body spring comprising an upper and a lower section, of a housing fitting around one end of the lower section of the body spring, means for pivotally connecting the housing to said lower spring section, shackle plates for pivotally connecting the upper section of the body spring with said housing, and means for rendering said shackle plates rigid with said upper section incident to an upward movement or rebound of said upper spring section.

10. In a combined shock absorber and rebound check for vehicles the combination with a body spring, of a housing pivoted to said body spring, a shock absorber spring between one face of said body spring and a part of said housing and a rebound spring also between said body spring and another part of said housing, said shock absorber and rebound springs being on opposite faces of said body spring and at the same side of the pivot point between said housing and body spring.

11. In a combined shock absorber and rebound check for vehicles, a body spring, a frame member pivoted at one point to the end of said body spring, said frame member extending parallel with said body spring and having parts passing above and parts below the body spring, a shock absorber spring between the body spring and the part of the housing passing over the body spring, a rebound spring between the opposite face of said body spring and the part of the frame member passing beneath the body spring, both said shock absorber spring and rebound spring being at the same side of the pivot point of the frame member.

12. In a combined shock absorber and rebound check for vehicles the combination with a body frame and a body supporting spring, of a housing pivoted at one end to one end of said body spring, a part of said housing passing over and part beneath said body spring, a shock absorber spring interposed between said body spring and the part of the housing passing thereover, a rebound spring between the opposite face of the body spring and the part of the housing passing therebeneath, and means for pivotally connecting the body frame of the vehicle with said housing at a point between the pivoted end of the housing and the end thereof engaged by said shock absorber and rebound springs.

In witness whereof, I have hereunto set my hand and seal at Indianapolis, Indiana, this 9th day of August, A. D. nineteen hundred and twenty-one.

GEORGE G. F. BOSWELL. [L. S.]

Witnesses:
CAREY S. FRYE,
M. L. SHULER.